United States Patent
Kane et al.

(10) Patent No.: US 9,663,238 B2
(45) Date of Patent: May 30, 2017

(54) NACELLE INLET LIP SKIN WITH PAD-UP DEFINING A DEVELOPABLE SURFACE HAVING PARALLEL RULING LINES

(71) Applicant: The Boeing Company, Chicago, IL (US)

(72) Inventors: Daniel J. Kane, Mercer Island, WA (US); Stuart W. Vogel, Long Beach, CA (US); Hoa V. Truong, Irvine, CA (US); Michael W. Kass, Seattle, WA (US); Andrew T. Gilmore, Mukilteo, WA (US); Paul D. Whitmore, Kirkland, WA (US); Jack W. Mauldin, Mill Creek, WA (US); Alejandro Silva, Rancho Santa Margarita, CA (US); John Ybarra, Placentia, CA (US)

(73) Assignee: The Boeing Company, Chicago, IL (US)

( * ) Notice: Subject to any disclaimer, the term of this patent is extended or adjusted under 35 U.S.C. 154(b) by 518 days.

(21) Appl. No.: 14/076,450

(22) Filed: Nov. 11, 2013

(65) Prior Publication Data

US 2015/0129045 A1    May 14, 2015

(51) Int. Cl.
*F02C 7/04* (2006.01)
*B64D 33/02* (2006.01)

(52) U.S. Cl.
CPC .............. *B64D 33/02* (2013.01); *F02C 7/04* (2013.01); *B64D 2033/0286* (2013.01); *Y10T 137/0536* (2015.04)

(58) Field of Classification Search
CPC ... B64D 33/02; B64D 2033/0286; F02C 7/04; Y10T 137/0536
See application file for complete search history.

(56) References Cited

U.S. PATENT DOCUMENTS

| | | | | |
|---|---|---|---|---|
| 5,581,054 A | * | 12/1996 | Anderson | B64D 33/02 181/213 |
| 6,328,258 B1 | * | 12/2001 | Porte | B64D 29/06 244/53 B |
| 6,447,255 B1 | * | 9/2002 | Bagnall | F01D 5/066 277/626 |
| 6,837,459 B2 | * | 1/2005 | Gonidec | B64D 29/00 244/120 |
| 7,506,838 B2 | * | 3/2009 | Porte | F01D 21/04 123/41.7 |
| 7,923,668 B2 | * | 4/2011 | Layland | B64D 15/12 219/529 |
| 8,197,191 B2 | | 6/2012 | Binks et al. | |
| 8,267,642 B2 | | 9/2012 | Binks et al. | |

(Continued)

FOREIGN PATENT DOCUMENTS

GB     2259115    *    3/1993    ............... F02C 7/00

*Primary Examiner* — Lorne Meade
(74) *Attorney, Agent, or Firm* — Felix L. Fischer (57) ABSTRACT

A nacelle inlet is provided for a turbo-fan engine for an aircraft. The nacelle inlet includes a lip skin having first and second pad-ups, an inner barrel including a forward flange and a bulkhead. The bulkhead, the lip skin and the inner barrel are attached together at mating surfaces. The bulkhead and the lip skin are attached together at mating surfaces. Each mating surface defines a surface geometry which approximates a developable surface having parallel ruling lines. The developable surfaces are formed by machining.

16 Claims, 4 Drawing Sheets

(56) References Cited

U.S. PATENT DOCUMENTS

| | | | | |
|---|---|---|---|---|
| 8,540,185 B2* | 9/2013 | Vauchel | ................. | B64D 15/12 |
| | | | | 244/134 D |
| 8,752,795 B2* | 6/2014 | Stewart, III | ........... | B64D 33/02 |
| | | | | 244/131 |
| 9,114,884 B2* | 8/2015 | Chelin | ....................... | B64C 7/02 |
| 2009/0134272 A1* | 5/2009 | Vauchel | ................. | B64D 15/12 |
| | | | | 244/54 |
| 2011/0168852 A1* | 7/2011 | Porte | ....................... | B64C 21/10 |
| | | | | 244/53 B |
| 2012/0060938 A1* | 3/2012 | Chelin | ...................... | B64C 7/02 |
| | | | | 137/15.1 |
| 2012/0126062 A1* | 5/2012 | Stewart, III | ........... | B64D 33/02 |
| | | | | 244/131 |
| 2012/0160933 A1* | 6/2012 | Vauchel | ................. | F02K 1/827 |
| | | | | 239/265.11 |
| 2012/0261521 A1 | 10/2012 | Porte et al. | | |

\* cited by examiner

NACELLE INLET LIP SKIN WITH PAD-UP DEFINING A DEVELOPABLE SURFACE HAVING PARALLEL RULING LINES

BACKGROUND

An aircraft may include one or more engines mounted to the wings, empennage or other structure of the aircraft. To improve aerodynamics of the flow of air around and/or into the engine, engines are typically housed in a nacelle, which includes a lip skin at the inlet of the nacelle.

The lip skin is typically an aerodynamically shaped annular member. The lip skin is usually formed of aluminum, but may be formed of other impact resistant materials, such as titanium. The lip skin includes a curved leading nose, an outer trailing surface, the outer trailing surface extending from the nose and terminating in an edge, and an inner trailing surface, the inner trailing surface extending from the nose and terminating in an edge. The lip skin may thus define a pocket formed by the nose, the outer trailing surface and the inner trailing surface. The lip skin, which may be relatively thin along its length, may lack rigidity. Additional structural components may be mounted in the lip skin to improve the lip skin's performance in bending and torsion. It may be desirable for the lip skin to be smooth and devoid of irregularities and discontinuities so as to reduce drag and to avoid the creation of turbulence and great effort is typically required to design and implement such a lip skin.

Lip skins typically have complex shapes that can be difficult to manufacture. Lip skins are typically produced by multiple-stage deep draw operations, bulge forming, or spin forming, requiring complex and costly tooling and time consuming multi-step processing. A lip skin may have compound curved profiles or be contoured, e.g., as may be dictated based on desired aerodynamic performance. For example, a lip skin may be contoured or curved along a length of the lip skin (e.g., along the forward-aft direction) as well as circumferentially. As a result, it can be difficult to meet tolerance and/or waviness requirements for joining the lip skin to an associated bulkhead. The lip skin may be joined to other structure, for example a bulkhead arranged internally in the pocket defined by the lip skin. In conventional lip skins, waviness in the contoured surface may be introduced at the joints, for example due to skin pull-up/deflection at the locations where the skin is joined to other structure. Conventional lip skin designs are typically sensitive to longitudinal placement (e.g., along the forward-aft direction) of the mating parts. Waviness or disturbances along the lip skin or imperfect assembly of such more sensitive designs may cause the airflow along the lip skin to become turbulent which may increase the drag and consequently the energy consumption of the aircraft. Precise manufacturing and assembly tolerances may be required, which typically drives complexity and costs up, and drives rates of production down.

Accordingly, it may be desirable to provide a joint, for example for a lip skin of a nacelle, which may be suitable for laminar flow.

SUMMARY

A nacelle inlet is provided for a turbo-fan engine for an aircraft. The nacelle inlet includes a lip skin having first and second pad-ups, an inner barrel including a forward flange and a bulkhead. The bulkhead, the lip skin and the inner barrel are attached together at mating surfaces. Each mating surface defines a surface geometry which approximates a developable surface having parallel ruling lines. The developable surfaces are formed by machining.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

A nacelle inlet 20 for a turbo-fan engine for an aircraft is provided. The nacelle inlet 20 includes a lip skin 22, an inner barrel 24 connected to the lip skin 22 by a forward bulkhead 26, and an outside mold line (OML) panel 28 connected to the lip skin 20 by a joint 30. The inner barrel 24 may define a duct for directing air into the engine of the aircraft. The lip skin 22 may include one or more stiffeners 32. For example one or more circumferential stiffeners 32 may be connected to the lip skin 22 and may provide additional stiffness to the lip skin. The stiffeners may be made from metallic or composite materials and may be attached to the lip skin 22 using conventional technique such as bonding. The nacelle inlet 20 may also include an aft bulkhead 34 spanning between and connected to the OML panel 28 and to the inner barrel 24.

Figure 3:
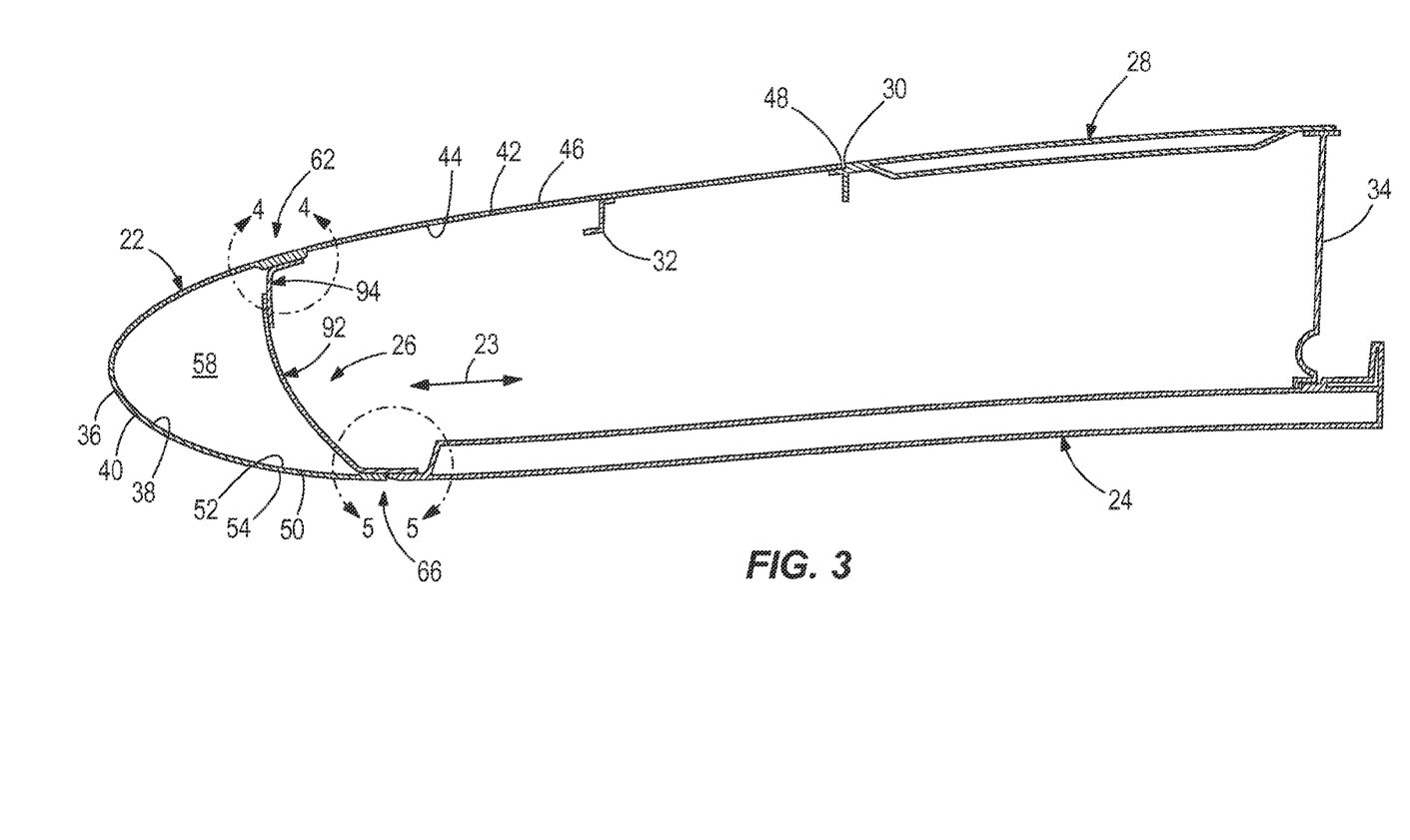
FIG. 3 is cross-sectional view of the nacelle inlet according to a first embodiment.

The nacelle inlet 20 according to the present disclosure may be configured for laminar flow as will be further described. The lip skin 22 described herein is configured for ease of assembly while maintaining aero smoothness and thereby enabling laminar flow. According to the examples herein, the nacelle inlet 20 reduces the effect of tolerances which would impact laminar flow by making the joints between the lip skin 22 and the forward bulkhead 26 virtually insensitive to the forward/aft location (shown by the arrow 23 in FIG. 3) of the forward bulkhead 26 relative to the lip skin 22.

The lip skin 22 may be formed into a thin, annular, aerodynamically shaped metal skin by conventional techniques, for example bending, stretch-forming, machining or the like. The lip skin 22 may be formed as a single piece, or a plurality of separably connected circumferential segments joined together as is known in the art. The lip skin 22 is usually formed of aluminum, but may be formed of other impact resistant materials, such as titanium, titanium and/or aluminum alloys, or composite materials. The lip skin 22 includes a curved leading nose 36 having an internal face 38 and an external face 40, and an outer or first trailing surface 42 having a first internal face 44 and a first external face 46, the outer or first trailing surface 42 extending from the nose 36 to a first edge 48. The lip skin 22 further includes an inner or second trailing surface 50 having a second internal face 52 and a second external face 54, the second or inner trailing surface 50 extending from the nose 36 to a second edge 56. A cavity or pocket 58 is formed by the nose 36 and at least a portion of the outer trailing surface 42 and the inner trailing surface 50. The nose 36 may be configured to provide a smooth transition between the outer and inner trailing surfaces 42, 50, while creating a small frontal area to reduce drag, In some examples, the outer trailing surface 42 may be longer than the inner trailing surface 50, e.g., as shown in the embodiment depicted in FIG. 3, however the present disclosure is not limited in this regard.

The outer surface of the lip skin (e.g., the external faces 40, 46, 54 of lip skin 22) may be manufactured to meet certain waviness requirements such that the inlet 20 may be compatible with laminar flow. The external faces 40, 46, 54 of the lip skin may be smooth and devoid of irregularities and discontinuities so as to reduce drag and to avoid the creation of turbulence. The external faces 54, 46 (often referred to as outer mold line) of the inner and outer trailing surfaces 50, 42 may be contoured or curved along a length of the lip skin 22 (e.g., along the forward-aft direction) as well as circumferentially, e.g., to achieve desired aerodynamic performance. In some conventional lip skins, the internal faces (often referred to as inner mold line) of the lip skin may follow the same contours as the outer faces or outer mold line. The internal faces or inner mold lines defines mating surfaces for components internal to the lip skin. Thus, in the case of conventional lip skins, complex outer mold line contours, which may be desirable for aerodynamic performance, may adversely affect ease of manufacturing (e.g., by necessitating mounting of internal components to complex curved surfaces). In conventional lip skins, distortion of the outer contours may result when internal structure is attached to the skin and/or the lip skin is joined to other aerodynamic surface, e.g., by skin pull-up. Nacelle inlets according to the present disclosure may provide improved methods and assemblies by making the joints between the lip skin, the forward bulkhead, and/or the inner barrel less sensitive to forward aft location of the forward bulkhead. For example, mating surfaces may be defined along one or more of the internal faces which may be simplify assembly as will be further described.

Figures 1, 2:
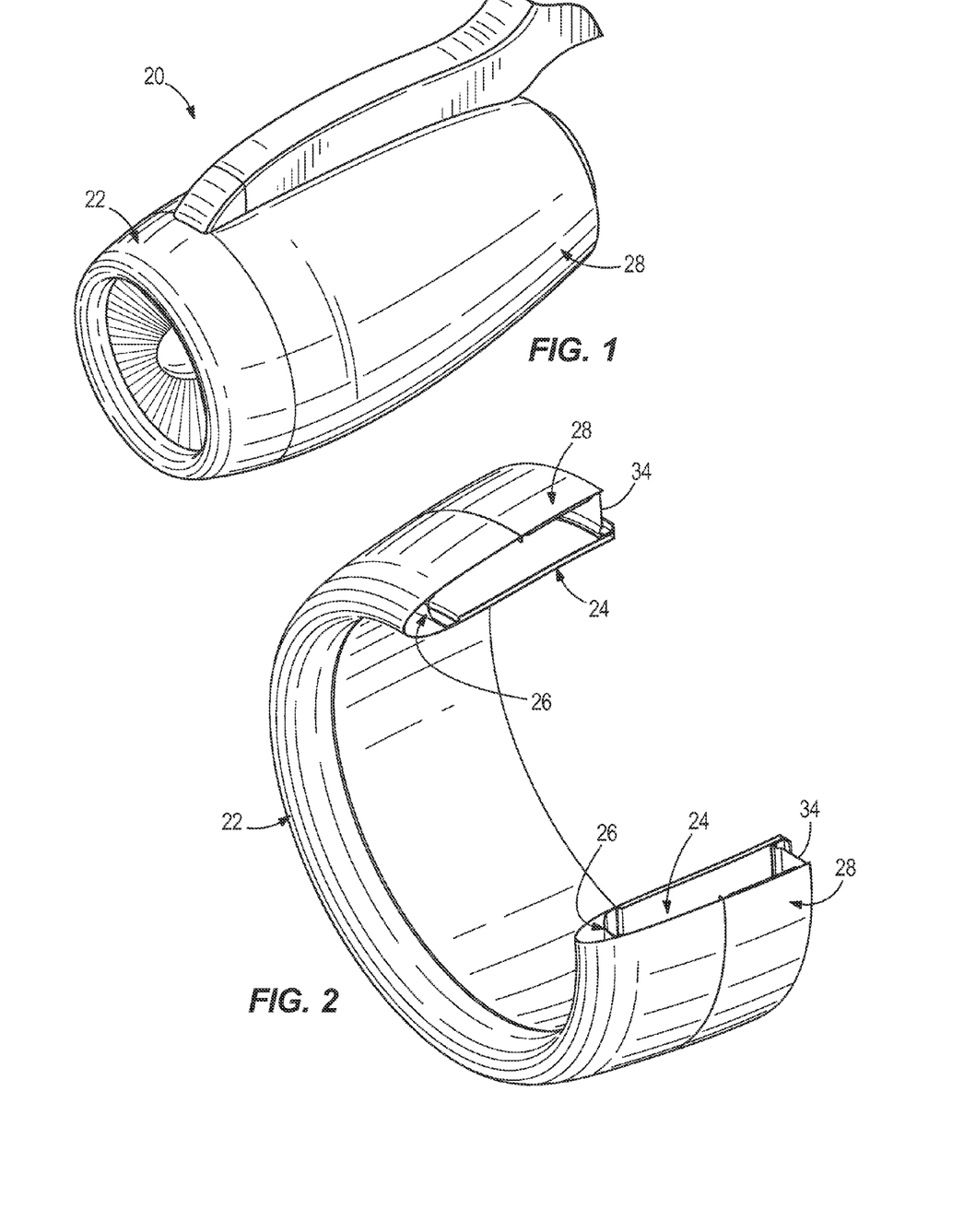
FIG. 1 shows a perspective view of an nacelle inlet for a turbo-fan engine of an aircraft.
FIG. 2 shows an enlarged perspective view of a portion of the nacelle inlet, and partially cut-away to see the interior of the nacelle inlet.

In the examples depicted in FIGS. 3-7, the outer trailing surface 42 of the lip skin 22 is connected to the forward bulkhead 26 via fasteners 60 at a joint 62 as described herein (the fasteners 60 are shown schematically so that the joint 62 is more clearly illustrated; these are not shown in FIG. 1). The inner trailing surface 50 of the lip skin 22, the inner barrel 24 and the forward bulkhead 26 are connected together via fasteners 64 at a joint 66 as described herein (the fasteners 64 are shown schematically so that the joint 66 is more clearly illustrated; these are not shown in FIG. 1). The OML panel 28 which may be made according to techniques known in the art is connected to the edge 48 at joint 30 in a known manner. Aft bulkhead 34 extends between OML panel 28 and the inner barrel and is connected thereto in a known manner.

Initially, the lip skin 22 is formed with a constant skin thickness in a known manner, the thickness being defined between the internal and external faces 38, 40, 44, 46, 52, 54. In the present invention, the lip skin 22 is machined to form a pad-up 68 in the internal face 44 of the outer trailing surface 42 of the lip skin 22, and is machined to form a pad-up 70 in the internal face 52 of the inner trailing surface 50 of the lip skin 22. The pad-up 68 is formed proximate to, but spaced from, the nose 36. The pad-up 68 may extend continuously and circumferentially around the circumference of the lip skin 22. In other examples, a plurality of pad-ups may be formed at certain circumferential locations, e.g., only at locations where the forward bulkhead is to be fastened to lip skin 22. The pad-up 70 is formed at or proximate to the edge 56 of the lip skin 22. The pad-up 70 may extend continuously and circumferentially around the circumference of the lip skin 22. In some examples, a plurality. of pad-ups 70 may be used at desired circumferential locations. Pad-up 68 is defined by an area of increased thickness T1 of the lip skin 22 relative to the thicknesses T2 of the adjacent areas 72, 74 of the lip skin 22. Pad-up 70 is defined by an area of increased thickness T3 relative to the thickness T4 adjacent area 76 of the lip skin 22. Thicknesses T1 and T3 may be equal or dissimilar. The pad-ups 68, 70 are formed by machining the adjacent areas 72, 74, 76 of the lip skin 22 away to provide the increased thicknesses T1, T3 at the pad-ups 68, 70. As such, the pad-ups 68, 70 define mating surfaces 68a, 70a. The mating surfaces 68a, 70a of the pad-ups 68, 70 approximate developable surfaces. A "developable surface" as used herein is a surface with zero Gaussian curvature. That is, a developable surface as used herein is a "surface" that can be flattened onto a plane without distortion (i.e. "stretching" or "compressing"). Conversely, a developable surface as used herein is a surface which can be made by transforming a plane (i.e. folding, bending, roiling, cutting and/or "gluing"). In three dimensions, all developable surfaces are ruled surfaces, and as such developable surface and ruled surface may be used interchangeably herein. As further defined herein, a surface with "parallel ruling lines" is a surface that can be unrolled. In the present context "parallel" means that the ruling lines intersect in infinity. Developable surfaces can be created with parallel ruling lines by extruding any curve. The developable surfaces of the pad-ups 68, 70 may be circular, cylindroid or cylindroid-like shape.

The inner barrel 24 may be an aerodynamically shaped skin, which may be strengthened to withstand a blade out condition and/or include acoustic dampening properties. The inner barrel 24 can be formed as a single piece, or a plurality of separably connected circumferential segments joined together as is known in the art. The inner barrel 24 is typically constructed of aluminum or composite materials and includes acoustic treatment for attenuating engine noise. The inner barrel 24 includes a main body 78 and a forward flange 80 extending from the main body 78. The main body 78 has an internal face 82 and an external face 84, which defines a thickness T5 therebetween. The flange 80 has an internal face 86, an external face 88 and terminates in an edge 90. The external face 88 of the flange 80 may be contoured or curved along a length of the lip skin 22 (e.g., along the forward-aft direction) as well as circumferentially. The internal face 86 of the flange 80 may be machined to form a mating surface 80a thereon. The mating surface 80a may approximate a developable surface, which may facilitate ease of assembly of the inner barrel 24 with the lip skin 22 to form the nacelle inlet 20. The flange 80 defines a thickness T5, the thickness being defined between the internal and external faces 86, 88 of the flange 80, which is substantially less than the thickness T6 of the main body 78. A "developable surface" as used herein is a surface with zero Gaussian curvature. That is, a developable surface as used herein is a "surface" that can be flattened onto a plane without distortion (i.e. "stretching" or "compressing"). Conversely, a developable surface as used herein is a surface which can be made by transforming a plane (i.e. folding, bending, rolling, cutting and/or "gluing"). In three dimensions, all developable surfaces are ruled surfaces, and as such developable surface and ruled surface may be used interchangeably herein. As further defined herein, a surface with "parallel ruling lines" is a surface that can be unrolled. In the present context, "parallel" means that the ruling lines intersect in infinity. Developable surfaces can be created with parallel ruling lines by extruding any curve.

The nacelle inlet 20 further includes a forward bulkhead 26, which may include a spanning member 92 and an angle flange 94. The spanning member 92 and angle flange 94 may be joined by any suitable means, such as fasteners 93. The spanning member 92 may have a curved main body 96. The forward bulkhead 26, when viewed in plan, is an annular member which generally matches the profile of the lip skin 22 at the points of attachment of the forward bulkhead 26 in the pocket 58 formed by the lip skin 22. The forward bulkhead 26 has a flange 98 at an end of the spanning member 92 opposite the angle flange 94. The forward bulkhead 26 is formed of a rigid material to provide strength and rigidity to the lip skin 22. The forward bulkhead 26 may be formed of aluminum or titanium, for example. The forward bulkhead 26 may be used to join the lip skin 22 to the inner barrel 24, In the assembled configuration, the end portion of the lip skin 22 including pad-up 70 and the flange 80 are positioned side to side with the edge 90 of the inner barrel 24 and the edge 56 of the lip skin 22 positioned proximate to each other. The flange 98 of the forward bulkhead 26 is positioned such that it extends at least partially over the pad up 70 and the flange 80 to join the lip skin 22 to the inner barrel 24. The treating surface 80a of the flange 80, the mating surface 70a of the pad-up 70, and/or the mating surface 98a of the flange are machined to approximate ruled surfaces, which may be parallel to one another resulting in a joint which may be less sensitive to forward-aft placement of the flange 98 of the forward bulkhead. In some examples, the mating surfaces 68a, 70a of the pad-ups 68, 70 and the mating surface 80a of the flange 80 defines a surface geometry which approximates a developable surface having parallel ruling lines normal to the fasteners 60, 64. One or more shims may be used between the mating surfaces 98a, 70a, and/or 80a in some applications, as will be further described with reference to FIG. 7.

Figures 4, 5, 7:
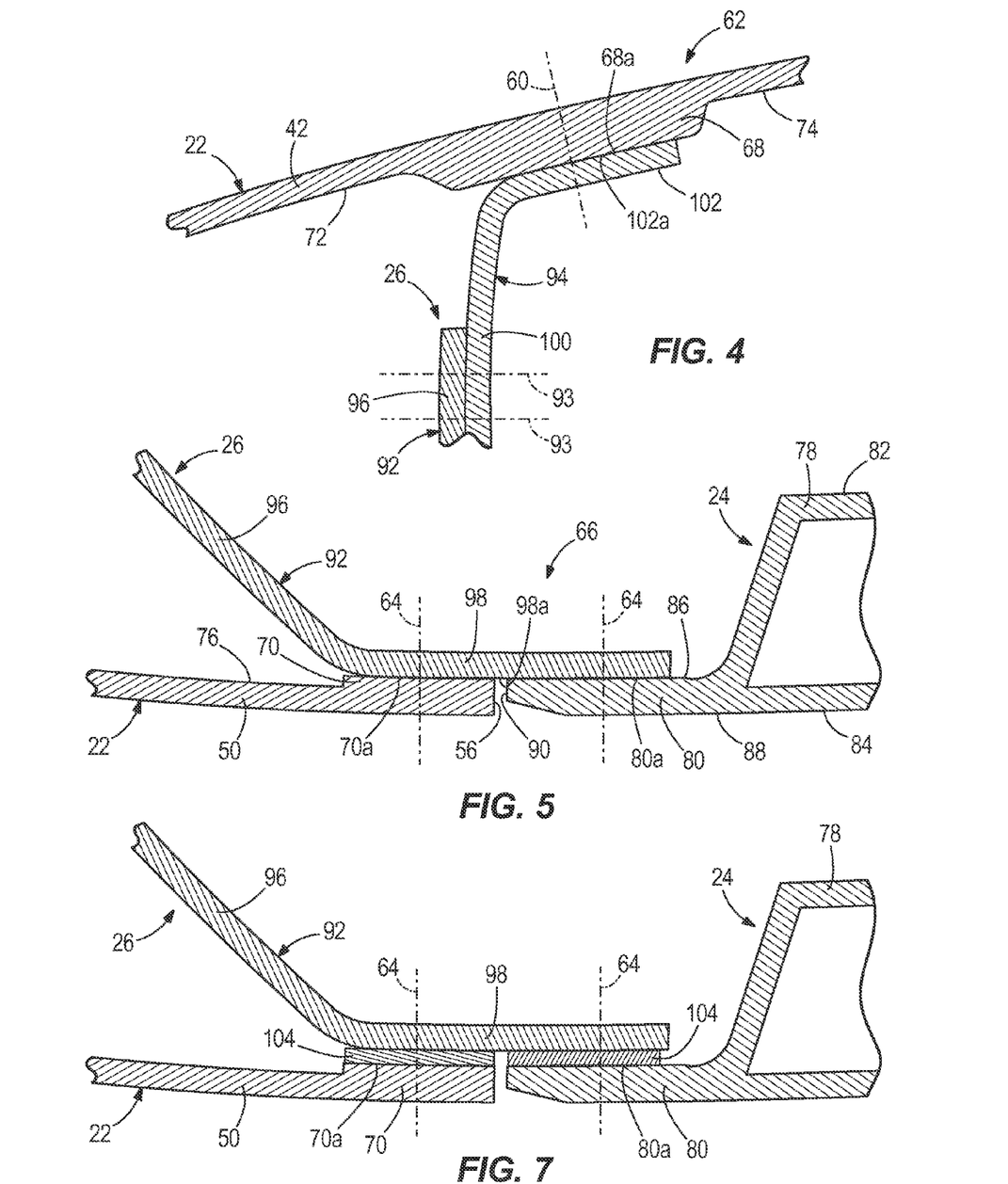
FIG. 4 is an enlarged cross-sectional view of the nacelle inlet along line 4-4 of FIG. 3.
FIG. 5 is an enlarged cross-sectional view of the nacelle inlet along line 5-5 of FIG. 3.
FIG. 7 is an enlarged cross-sectional view of a nacelle inlet according to a second embodiment.
Figure 6:
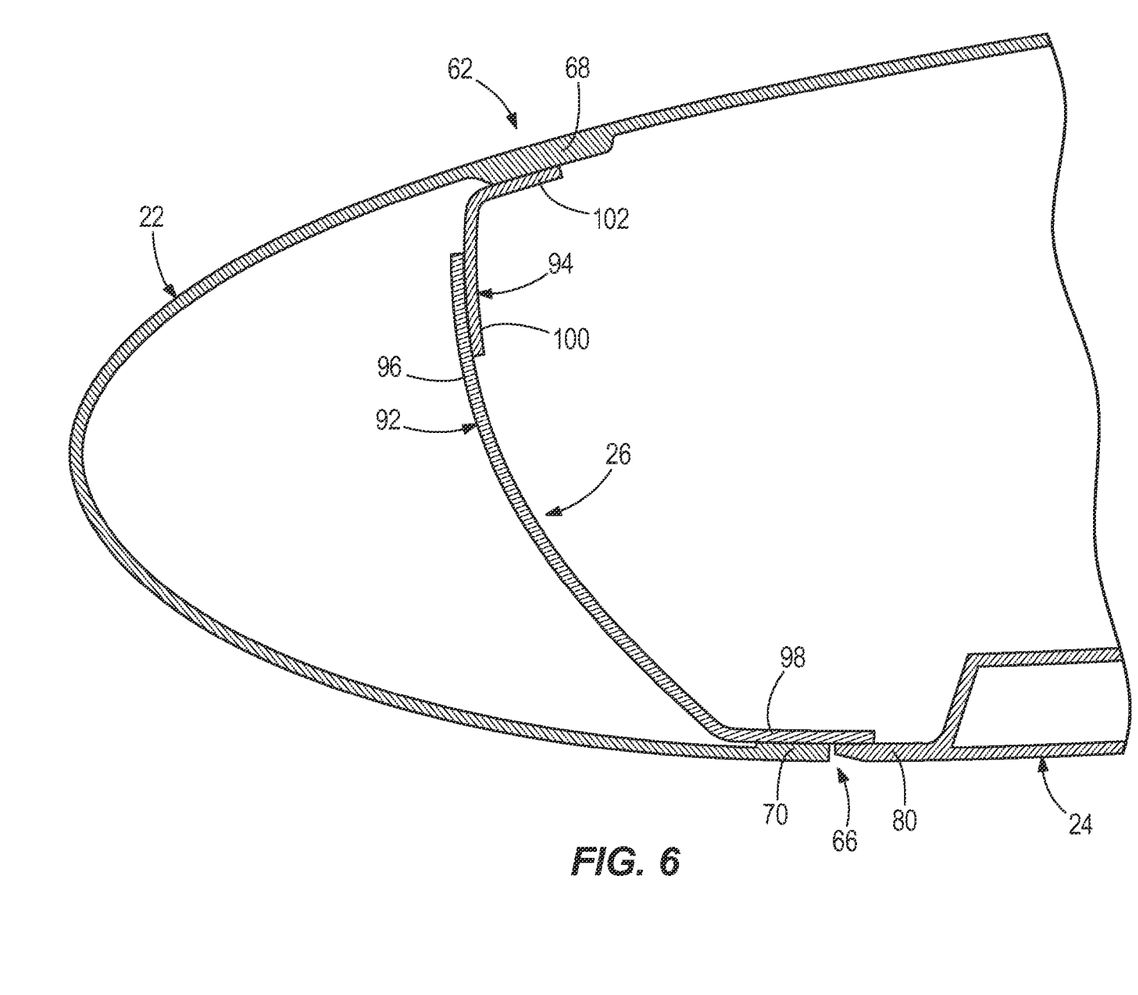
FIG. 6 is a cross-sectional view of a portion of the nacelle inlet with the bulkhead in different position from that of FIG. 2.

With further reference to FIG. 4, the angle flange 94 is attached to the opposite end of the spanning member 92. The angle flange 94 is generally L-shaped with first and second legs 100, 102 that are angled relative to each other. The first leg 100 abuts against the end of the spanning member 92 and is attached thereto by suitable means, such as fasteners 93. The first leg 100 has a profile which matches the profile of the spanning member 92. A mating surface 102a is defined on the exterior surface of the second leg 102 which is substantially linear at all points around the forward bulkhead 26. The angle flange 94 has a high coefficient of thermal expansion (CTE) (>6.0×10-6 in/in/DegF between 70° F. and 500° F.) and a high modulus (E>28×10$^6$ psi). The angle flange 94 may be formed of aluminum or titanium, for example.

To assemble the joint 66, the edge 90 of the inner barrel 24 and the edge of the inner trailing surface 50 are positioned proximate to each other, and the mating surface 98a of the end flange 98 of the spanning member 92 is abutted against the mating surfaces 70a, 80a of the pad-up 70 and the flange 80 and then fastened thereto by the fasteners 64. The end flange 98 of the spanning member 92 is slid along the mating surfaces 70a, 80a until the desired position of the spanning member 92 is reached. As such, the mating surfaces 70a, 98a of the pad-up 70 and the forward bulkhead 26 abut against each other in a slip fit configuration, and the mating surfaces 80a, 98a of the inner barrel 24 and the forward bulkhead 26 abut against each other in a slip fit configuration, for easy assembly. Because the mating surfaces 70a, 80a are machined developable surfaces, the tolerance between the mating surfaces 80a, 98a, 98a can be controlled, and the geometry reduces the variability during assembly of the lip skin 22 with the spanning member 92 and reduces local skin deflections. The pad-up 70 reduces pull-up and induced waviness when the spanning member 92 is fastened to the lip skin 22 because the pad-up 70 provides a radially and torsional stiffener. Because the mating surfaces 70a, 80a of the pad-up 70 and the flange 80 are aligned in the forward/aft direction, there is no joggle in the bulkhead 26 which enables the slip fit assembly.

To assemble the joint 62, the mating surface 102a of the second leg 102 of the angle flange 94 is abutted against the mating surface 68a of the pad-up 68 until the first leg 100 of the angle flange 94 abuts against the spanning member 92. As a result, the first leg 100 of the angle flange 94 and the spanning member 92 overlap each other. The first leg 100 and the spanning member 92 are then affixed to each other by suitable means such as fasteners 93. As such, the mating surfaces 68a, 102a abut against each other in a slip fit configuration for easy assembly. Because the mating surface 68a is a machined developable surface, the tolerance between the surfaces 68a, 102a can be controlled, and the geometry reduces the variability during assembly of the lip skin 22 with the forward bulkhead 26 and reduces local skin deflections. The pad-up 68 reduces pull-up and induced waviness when the forward bulkhead 26 is fastened to the lip skin 22 because the pad-up 68 provides a radially and torsional stiffener.

When the joint 62 is formed, the angle flange 94 is engaged with the pad-up 68, and this is not affected by the forward/aft location of the spanning member 92 because the angle flange 94 always spans the distance between the spanning member 96 and the pad-up 68. If the spanning member 92 is located more aft, as shown in FIG. 2, there is a greater amount of overlap between the angle flange 94 and the spanning member 92. If the spanning member 92 is located more forwardly as shown in FIG. 7, there is less overlap between the angle flange 94 and the spanning member 92.

As a result of the structure, the bulkhead 26 can be slid forward/aft relative to the lip skin 22 as needed without distortion of the outer contour of the lip skin 22.

The bulkhead 26 is pre-strained to act as a spring against the lip skin 22 and/or inner barrel 24. The curved shape of the main body 96 of the forward bulkhead 26 makes the forward bulkhead 26 softer (less stiff) radially which assists in maintaining laminar flow by reducing waviness in the lip skin 22 due to a differential CTE. In addition, the curved bulkhead 26 provides aids in the structural load capability, which aids the nacelle inlet 20 in resisting damage from bird strikes or blade outs.

The angle flange 94 has a high coefficient of thermal expansion (CTE) >6.0×10-6 in/in/DegF between 70° F. and 500° F.) and a high modulus (E>28×10$^6$ psi). This aids in reducing the waviness of the lip skin 22 and prevents the loosening of the fasteners 60, 64.

The geometry of the nacelle inlet 20 reduces the effect of tolerances which would impact laminar flow by making the joints 62, 66 insensitive to the forward/aft location of the forward bulkhead 26. The geometry of the nacelle inlet 20 allows for the angle flange 94 to be located by moving outward to match the lip skin 22 and not be affected by the forward/aft location of the forward bulkhead 26 and the joints 62, 66 to be a slip fit. The slip fit allows for the lip skin 22 (one piece or multi-piece) to be installed without shimming by matching the circumferential length of the lip skin 22 to the circumferential length of the forward bulkhead 26.

Even though not necessary, if desired, constant thickness shims 104, see FIG. 7, may installed between the lip skin 22 and the flange 98 and between the flange 80 and the flange 98 for maintaining aerodynamic smoothness across the joint 66.

The lip skin 22 may include integral stiffeners 32 produced by chemical milling, bonding, or conventional machining or a combination thereof. In other embodiments, the lip skin may 22 include mechanically attached stiffeners 32.

While the forward bulkhead 26 is shown and described as being formed of the spanning member 92 and the angle flange 94, it is to be understood that the forward bulkhead 26 can be formed of a single piece.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A nacelle inlet for a turbo-fan engine for an aircraft, the nacelle inlet comprising:
   a lip skin comprising
      a first pad-up having a first mating surface, wherein the first pad-up is defined by an area of increased thickness of the lip skin relative to thicknesses of adjacent areas of the lip skin;
      a second pad-up defining a fourth mating surface, said fourth mating surface machined as a developable surface;
   an inner barrel including a forward flange having a second mating surface;
   a bulkhead comprising
      a third mating surface disposed opposite the first and second mating surfaces, the lip skin and the inner barrel attached to one another using the bulkhead;
      a spanning member; and
      an angle flange having a fifth mating surface substantially linear at all points around the bulkhead to interface with the fourth mating surface, said angle flange having a first leg;
   wherein the first, second and third mating surfaces are each machined to be approximate developable surfaces with the first and second mating surface having parallel ruling lines with the third mating surface, said angle flange adapted for mating of the fourth and fifth mating surfaces prior to engagement between the first leg of the angle flange and the spanning member by a plurality of fasteners,
   wherein sliding engagement of the first, second and third mating surfaces positions the spanning member, and
   wherein sliding engagement of the fourth and fifth mating surfaces joins the first leg and the spanning member with greater or lesser overlap of the first leg and the spanning member determined by position of the first and third mating surfaces.

2. The nacelle inlet of claim 1, further comprising one or more shims between the first and third mating surfaces and/or between the second and third mating surfaces, each shim having a constant thickness.

3. The nacelle inlet of claim 1, wherein the fourth mating surface of the second pad-up is a ruled surface, the lip skin having a contoured exterior surface opposite the fourth mating surface.

4. The nacelle inlet of claim 1, wherein the lip skin and bulkhead are slideable relative to one another along a forward-aft direction without distortion of an outer contour of the lip skin.

5. The nacelle inlet of claim 1, wherein the lip skin and/or the inner barrel comprise a plurality of separably connected circumferential segments.

6. The nacelle inlet of claim 1, wherein the lip skin further comprises at least one circumferential stiffener.

7. The nacelle inlet of claim 1, wherein the lip skin and/or at least a portion of the bulkhead is formed of aluminum or titanium, and the inner barrel is formed of aluminum or composite materials.

8. A nacelle inlet for an aircraft engine, the nacelle inlet comprising:
   a lip skin comprising
      a contoured outer surface;
      a first pad-up having a first mating surface machined as a first ruled surface, wherein the first pad-up is defined by an area of increased thickness of the lip skin relative to the thicknesses of adjacent areas of the lip skin; and
      a second pad-up defining a fourth mating surface, said fourth mating surface machined as a developable surface;

an inner barrel including a first flange having a second mating surface machined as a second ruled surface;

a bulkhead comprising a spanning member;

an angle flange having a fifth mating surface substantially linear at all points around the bulkhead to interface with the fourth mating surface, said angle flange having a first leg connected to the spanning member said angle flange having a second leg connected to the second pad-up; and a second flange having a third mating surface machined as a third ruled surface, the third ruled surface extending over at least a portion of the ruled surfaces of the first ruled surface and the second ruled surface, the second flange joining the lip skin to the inner barrel wherein the first and second mating surfaces are machined to have parallel ruling lines with the third mating surface;

wherein said angle flange is adapted for mating of the fourth and the fifth mating surfaces prior to engagement between the first leg of the angle flange and the spanning member by a plurality of fasteners, wherein sliding engagement of the first, second and third mating surfaces positions the spanning member, and wherein sliding engagement of the fourth and fifth mating surfaces joins the first leg and the spanning member with greater or lesser overlap of the first leg and the spanning member determined by position of the first and third mating surfaces.

9. The nacelle inlet of claim 8, wherein each of the ruled surfaces defines a cylindroid.

10. The nacelle inlet of claim 8, wherein the second flange is free of joggles between the first pad-up and the first flange.

11. The nacelle inlet of claim 8, wherein the lip skin further comprises at least one circumferential stiffener.

12. The nacelle inlet of claim 8, wherein the lip skin and/or at least a portion of the bulkhead is formed of aluminum or titanium, and the inner barrel is formed of aluminum or composite materials.

13. The nacelle inlet of claim 8, wherein the bulkhead is pre-strained to act as a spring against the lip skin and/or the inner barrel.

14. The nacelle inlet of claim 8, wherein a rearward end of the lip skin is proximate to a forward end of the second flange of the bulkhead.

15. An aircraft comprising:

an engine; and a nacelle inlet for directing air into the engine, the nacelle inlet comprising a lip skin including a first pad-up and a second pad-up, wherein each pad-up is defined by an area of increased thickness of the lip skin relative to the thicknesses of adjacent areas of the lip skin, said first pad-up having a first mating surface, an inner barrel including a forward flange having a second mating surface, and a bulkhead having a third mating surface disposed opposite the first and second mating surfaces, the first, second and third mating surfaces each machined to be approximate developable surfaces with the first and second mating surface having parallel ruling lines with the third mating surface, the lip skin and inner barrel attached to one another using the bulkhead, and the bulkhead further comprising a spanning member and an angle flange connectable to the spanning member, the second pad-up having a fourth mating surface machined as a developable surface and the angle flange having a fifth mating surface substantially linear at all points around the bulkhead to interface with the fourth mating surface, said angle flange adapted for mating of the fourth and fifth mating surfaces prior to engagement between a first leg of the angle flange and the spanning member by fasteners whereby sliding engagement of the first, second and third mating surfaces positions the spanning member and sliding engagement of the fourth and fifth mating surfaces joins the first leg and spanning member with greater or lesser overlap of the first leg and spanning member determined by position of the first and third mating surfaces.

16. The aircraft of claim 15, wherein the lip skin has a contoured exterior surface opposite the fourth mating surface.

* * * * *